United States Patent
Li (10) Patent No.: US 6,657,559 B1
(45) Date of Patent: Dec. 2, 2003

(54) MOUSE WITH REMOTE CONTROL FUNCTION OF INFRARED RAY

(76) Inventor: Jing Li, P.O.B. 5001-410, Nam Fei, Xin Xi, Qiao, Nan Chang, Jiang Xi, 330024 (CN)

( * ) Notice: Subject to any disclaimer, the term of this patent is extended or adjusted under 35 U.S.C. 154(b) by 0 days.

(21) Appl. No.: 09/581,403

(22) PCT Filed: Dec. 15, 1998

(86) PCT No.: PCT/CN98/00308

§ 371 (c)(1),
(2), (4) Date: Jul. 25, 2000

(87) PCT Pub. No.: WO99/31570

PCT Pub. Date: Jun. 24, 1999

(30) Foreign Application Priority Data

| Dec. 16, 1997 | (CN) | 97230442 U |
| Dec. 16, 1997 | (CN) | 97230444 U |
| Feb. 4, 1998 | (CN) | 98210404 U |
| Feb. 4, 1998 | (CN) | 98210405 U |

(51) Int. Cl.[7] .............................................. H03K 17/94
(52) U.S. Cl. ........................ 341/20; 341/173; 341/176; 345/156; 345/163; 345/167; 455/74.9
(58) Field of Search ........................ 341/20, 176, 173; 345/164, 163, 167, 2.1, 169, 157, 156; 455/74.1

(56) References Cited

U.S. PATENT DOCUMENTS

| 5,726,684 A | * | 3/1998 | Blankenship et al. ........ 345/163 |
| 5,854,621 A | * | 12/1998 | Junod et al. ................. 345/158 |
| 5,943,625 A | * | 8/1999 | Yeom et al. ................. 345/157 |
| 6,219,037 B1 | * | 4/2001 | Lee ............................. 345/156 |
| 6,225,981 B1 | * | 5/2001 | Lu ............................. 345/163 |

FOREIGN PATENT DOCUMENTS

| CN | 93100683.X | 8/1994 |
| CN | 96237391.5 | 11/1997 |

OTHER PUBLICATIONS

International Search Report for application PCT/CN98/00308, dated Jan. 15, 1999.

* cited by examiner

*Primary Examiner*—Michael Horabik
*Assistant Examiner*—Albert K. Wong
(74) *Attorney, Agent, or Firm*—Merchant & Gould, P.C.

(57) ABSTRACT

A mouse with infrared remote control function comprises: an optical encode control circuit, a microprocessor circuit, a wire driver circuit of the transmitting part, an infrared modulating transmitter circuit, an infrared receiving demodulation circuit, a wire driver circuit of the receiving part, an interface switching circuit, a receiver/transmitter interface circuit and a power circuit (it can be switched off) for supplying the power circuit to the said optical encode control circuit, microprocessor circuit, infrared modulating transmitter circuit. Besides a single-purpose mouse with infrared remote control function is provided by the present invention, by using the interface switch circuit and automatic switch circuit, a dual-purpose mouse with both compatible infrared remote control function and compatible cable control function can be implemented.

14 Claims, 5 Drawing Sheets

MOUSE WITH REMOTE CONTROL FUNCTION OF INFRARED RAY

TECHNICAL FIELD

The present invention relates to an input device of a computer. In particular, it relates to a mouse with infrared remote control function.

BACKGROUND ART

Figure 1:
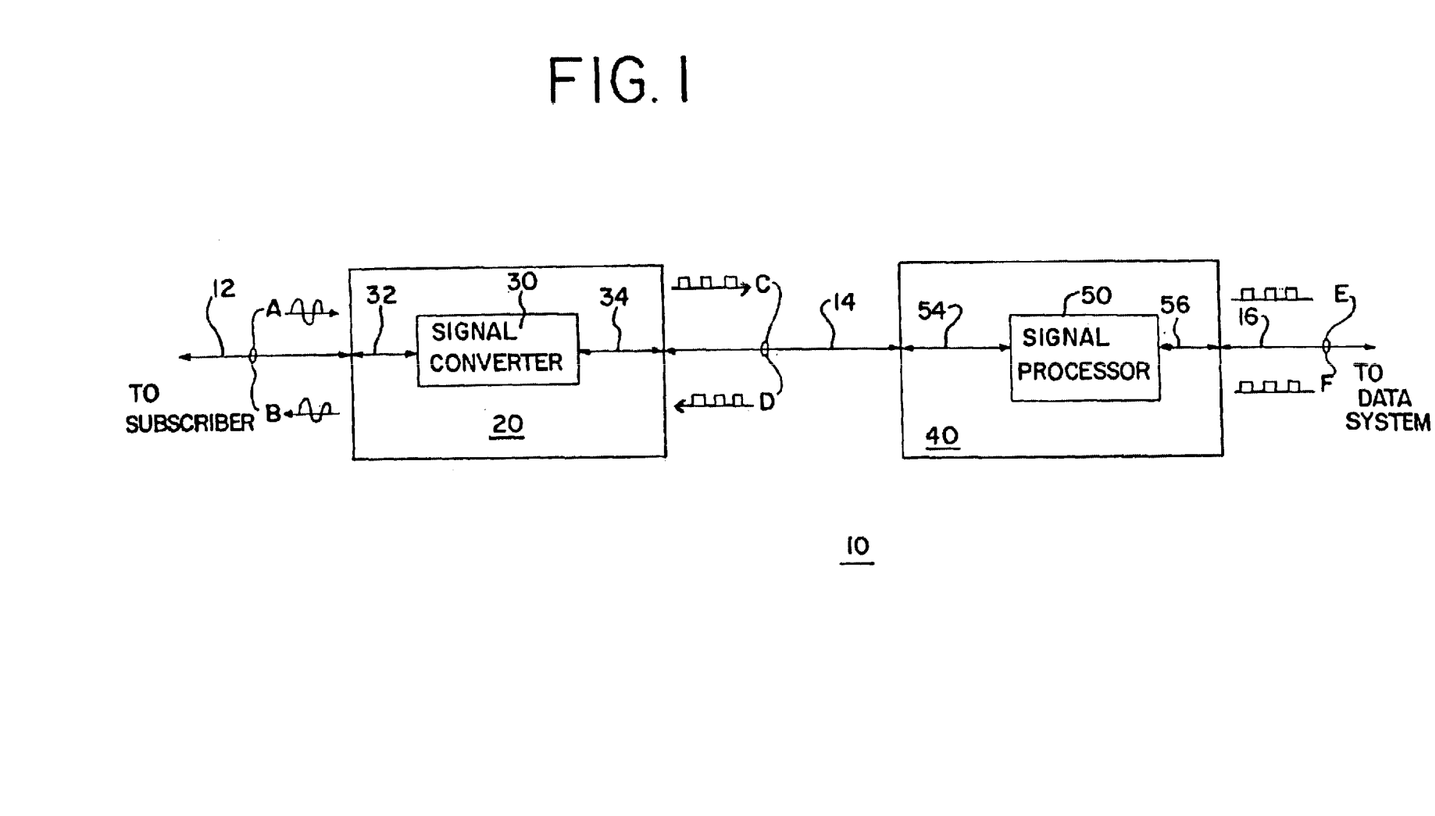
FIG. 1 is a circuit diagram showing the structure of a mouse in the prior art.

The existing mouse of a computer, for example, as shown in FIG. 1, is a mouse which is connected to a computer via a cable. The mouse consists of an optical coding control circuit 91, a microprocessor circuit 92, and a wire driver circuit 93. When it is operated, after the operation signal of the mouse is encoded by the optical coding control circuit 91 it is input to the microprocessor circuit 92 for further processing. After the processed signal is converted by the wire driver circuit 93, it is input to a port of the mainframe of the computer. Thereby, by using the mouse, the operation of a series of the computer instructions can be implemented. However, because the mouse is connected with the computer via a cable, there are at least two disadvantages: 1. it is limited by the cable that the mouse can not be operated remotely; 2. by dragging the cable for a long period makes it easy for breaking or damage.

SUMMARY OF THE INVENTION

The object of the present invention is to overcome the above disadvantages of the prior art and to provide a mouse with infrared remote control function.

The another object of the present invention is to provide a dual-purpose mouse also having the infrared remote control function. It can be switched to the infrared control operation mode or the cable control operation mode by an interface switch circuit and an automatic switch circuit.

A further object of the present invention is to provide a mouse which can be switched between a compatible two-key mode (Microsoft mode) and a compatible three-key mode (PC mode) with infrared remote control function.

Still another object of the present invention is to provide a mouse of a single compatible two-key mode or compatible three-key mode with infrared remote control function.

According to an aspect of the present invention, a mouse with infrared remote control function comprises:

an optical coding control circuit for outputting an optical encoded signal after optically encoding the input operation instructions;

a microprocessor circuit for outputting an encoded pulse signal after processing the optical encoded signal;

a wire driver circuit of a transmitting part for sending a signal to the mainframe of the computer after converting the encoded pulse signal;

an infrared modulating transmitter circuit for modulating the said encoded pulse signal with infrared modulation and transmitting the infrared modulated signal outwards;

an infrared receiving demodulation circuit for receiving the said infrared modulation signal and demodulating the said signal into an encoded pulse signal;

a wire driver circuit of a receiving part for converting the demodulated encoded pulse signal and then transmitting it to the mainframe of the computer;

an interface switch circuit for switching the said wire driver circuit of the transmitting part to an operative state or an inoperative state;

an automatic switch circuit for switching the said infrared receiving demodulation circuit, buffering circuit, and wire driver circuit of the receiving part to the operative state or the inoperative state;

a receiver/transmitter interface circuit for connecting the said interface switch circuit and automatic switch circuit; and a power circuit for supplying the power circuit(which can be switched off) to the said optical encode control circuit, microprocessor circuit and infrared modulating transmitter circuit.

According to another aspect of the present invention, a mouse with infrared remote control function comprises:

an optical coding control circuit for outputting an optical encoded signal after optically encoding the input operation instructions;

a microprocessor circuit for outputting an encoded pulse signal after processing the optical encoded signal;

an infrared modulating transmitter circuit for modulating the said encoded pulse signal with infrared modulation and transmitting the infrared modulated signal outwards;

an infrared receiving demodulation circuit for receiving the said infrared modulated signal and demodulating the said signal into an encoded pulse signal;

a wire driver circuit of a receiving part for converting the demodulated encoded pulse signal and then transmitting it to the mainframe of the computer; and a power circuit, for supplying the power circuit(which can be switched off) to the said optical encode control circuit, microprocessor circuit and infrared modulating transmitter circuit.

By using the mouse of the present invention, when the infrared remote control operation is being carried out, the operation range can be greater than 8 meters, and the operation of the mouse is flexible and is essentially with no directivity. In addition, the interface switch circuit and automatic switch circuit are configured in the mouse of the present invention thereby the mouse can be switched easily between the infrared remote control operation mode and the cable control operation mode.

According to the mouse of the present invention, the conversion between the compatible two-key mode and the compatible three-key mode as well as the operation of the single compatible two-key mode or the single compatible three-key mode can further be implemented. Apart from those, the advantages of the low power consume of the circuits and high performance/cost ratio are also involved in the mouse in accordance with the present invention.

The detailed description of the mouse of the present invention will be further explained in the following referring to the accompanying drawings and the embodiments. The further objects, advantages and effects will be apparent from the following description.

BEST MODE FOR CARRYING OUT THE INVENTION

Figure 2:
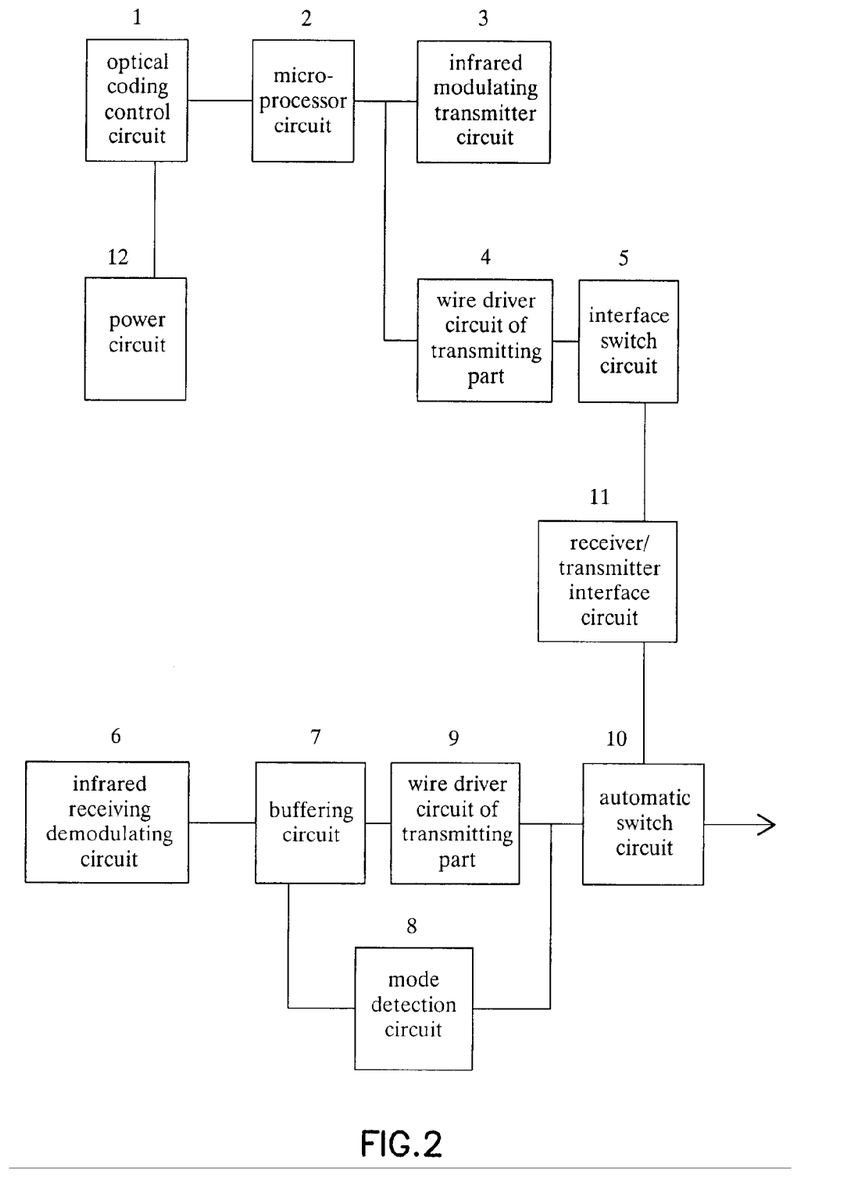
FIG. 2 is a block diagram showing a dual-purpose mouse according to the first embodiment of the present invention.
Figure 2A:
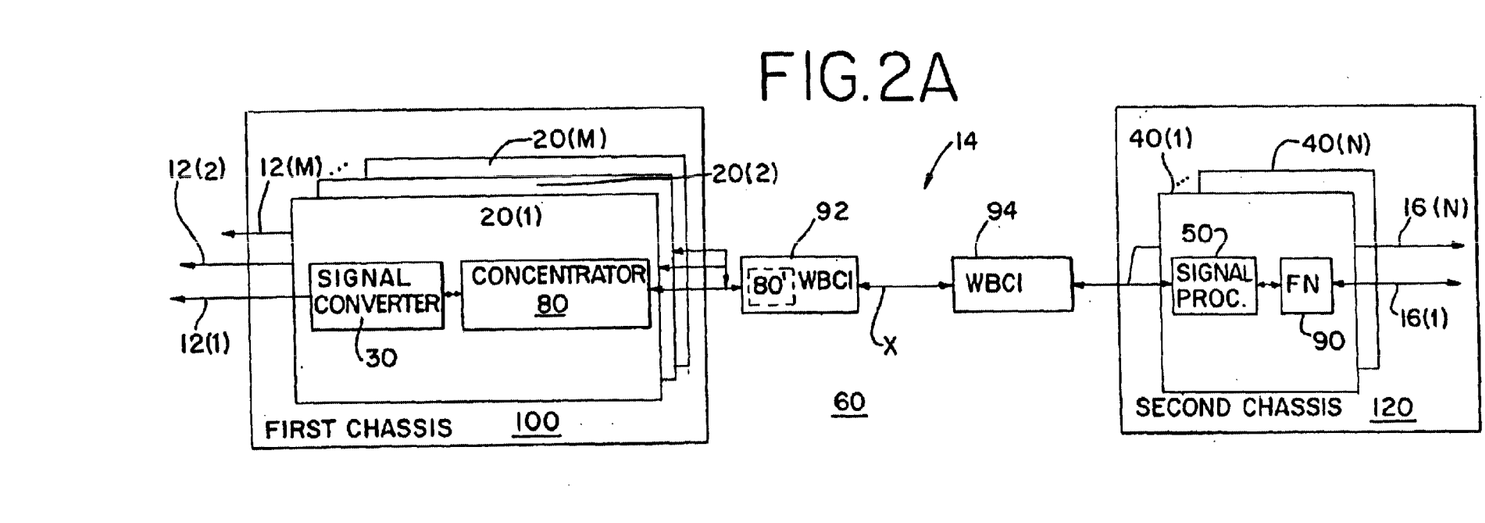
Figure 2B:
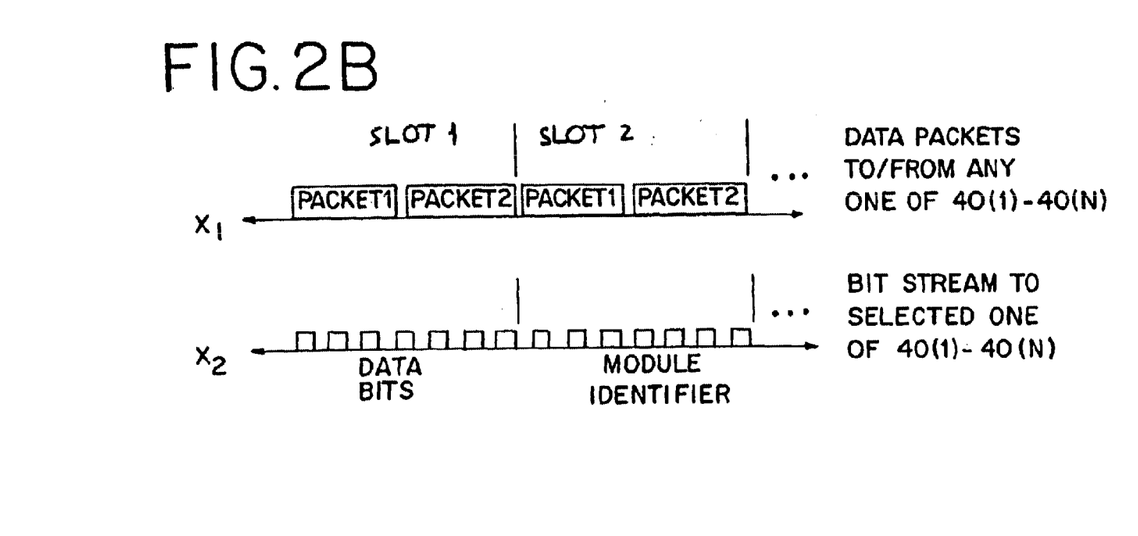

Referring to FIG. 2, a block diagram is shown to indicate a dud-purpose mouse in accordance with the first embodiment of the present invention. As shown in FIG. 2, the mouse comprises: an optical coding control circuit 1 for encoding optically the input operation instructions; a microprocessor circuit 2 for processing the optical encoded signal; a wire driver circuit 4 of a transmitting part for converting the optical encoded signal after processing and then transmitting the signal to the mainframe of the computer; an infrared modulating transmitter circuit 3 for modulating the processed optical encoded signal with infrared modulation and transmitting the infrared modulated signal outwards; an infrared receiving demodulation circuit 6 for receiving and demodulating the infrared modulated signal; a buffering circuit 7 for transmitting the optical encoded signal after demodulating and filtering the interference signal; a mode detection circuit 8 for setting the operation mode of the mouse and returning the mode detection result of the mouse back to the computer; a wire driver circuit 9 of the receiving part for converting the optical encoded signal after filtering the interference signal and transmitting the converted signal to the mainframe of the computer; an interface switch circuit 5 and an automatic switch circuit 10 for switching the mouse to an infrared remote control operation mode or a cable control operation mode; a mouse receiver/transmitter interface circuit 11 for connecting the interface switch circuit 5 and the automatic switch circuit 10 and a power circuit 12.

Wherein the transmitting part of the mouse is constructed by an optical coding control circuit 1, a microprocessor circuit 2, an infrared modulating transmitter circuit 3, a wire driver circuit 4 and a power circuit 12; while the receiving part of the mouse is constructed by an infrared receiving demodulation circuit 6, a buffering circuit 7, a mode detection circuit 8 and a wire driver circuit 9. When the remote control mode is carried out by the mouse, the wire driver 4 of the transmitting part is switched by the interface switch circuit 5 to the inoperative state; and the infrared receiving demodulation circuit 6, the buffering circuit 7, and the wire driver circuit 9 are switched by the automatic switch circuit 10 to the operative state (i.e., the remote control mode). When the line control operation mode is carried out by the mouse, the wire driver circuit 4 of the transmitting part is switched by the interface switch circuit 5 to the operative state; and the infrared receiving demodulation circuit 6, the buffering circuit 7, and the wire driver circuit 9 are switched by the automatic switch circuit 10 to the inoperative state.

Figure 3:
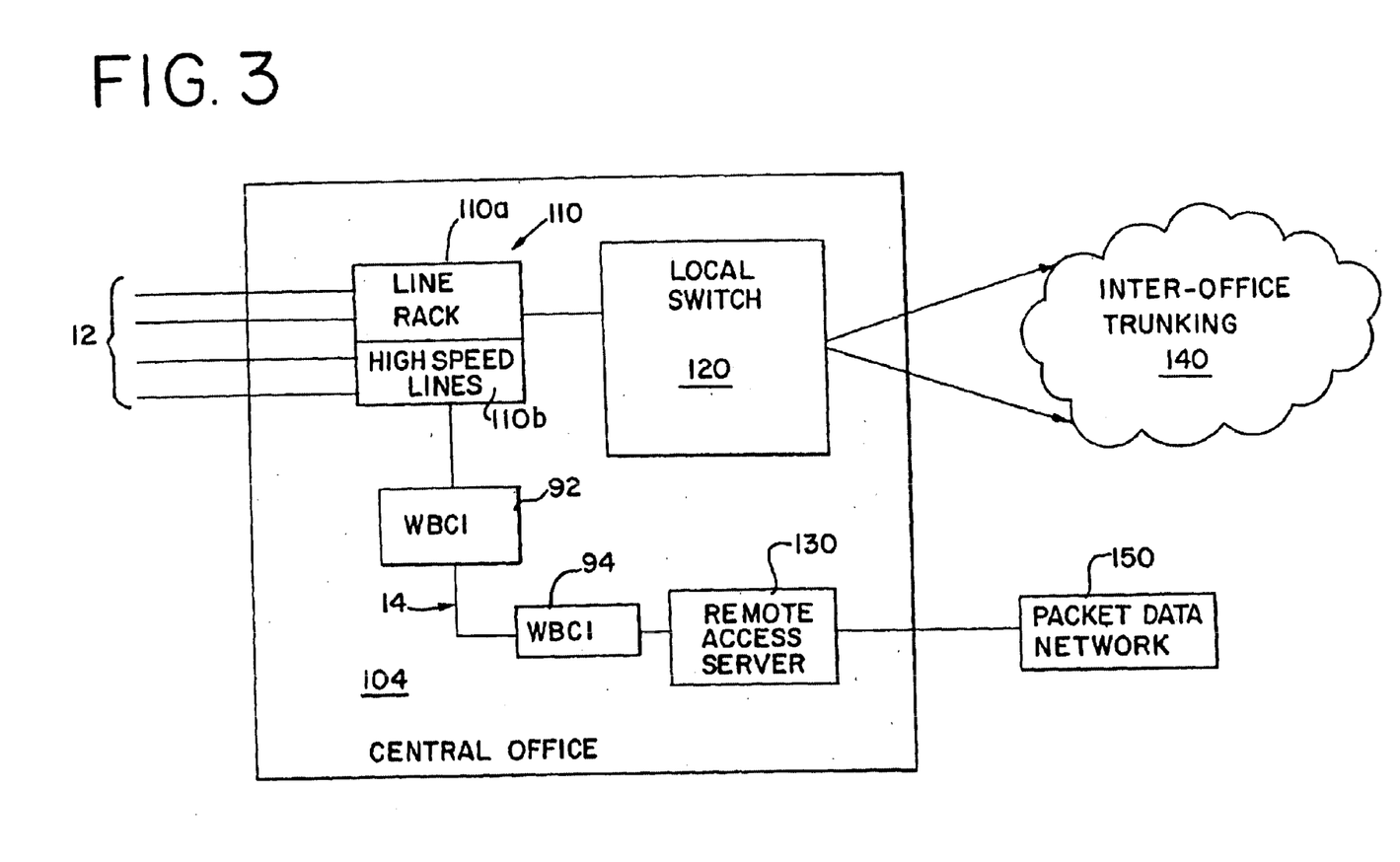
FIG. 3 is a detailed circuit diagram indicating the mouse shown in FIG. 2.

FIG. 3 is a detailed circuit diagram indicating the mouse shown in FIG. 2. Referring to FIG. 3, the optical coding control circuit 1, the microprocessor circuit 2 and the wire driver circuit 4 are the conventional mouse circuits. The pushbuttons RB, MB, and LB, the infrared light emitting diodes (LEDs) LED 1, LED 2, the infrared dual receiving tubes X1 and X2, as well as a resistor R1 are included in the optical coding control circuit 1. An integrated circuit U1 (e.g., type HM8530 mouse microprocessor), a crystal oscillator Y1, a resistor R4 connected to pin 6 of the integrated circuit U1, and a mode conversion switch S1 are included in the microprocessor circuit 2. The moving contact of the mode conversion switch S1 is connected to pin 3 of the integrated circuit U1, and two fix contacts of which are connected to pin 9 and pin 18 of the integrated circuit U1 respectively. Transistors Q2, Q3, a diode D1 and the resistors R5 and R6 are included in the wire driver 4.

NANDs U2A, U2B, a transistor Q1, LEDs LED3, LED4, and resistors R2 and R3 are included in the infrared modulating transmitter circuit 3, wherein two input pins of NAND U2B are connected in parallel to pin 8 of the integrated circuit U1, two input pins of NAND U2A are connected to pin 2 of the integrated circuit U1 and the output pin of NAND U2B respectively, the base of the transistor Q1 is connected to the output pin of NAND U2A via a resistor R2 and the collector of which is connected to the power circuit 12 (it will be described later) via the LEDs LED3, LED4, and the resistor R3 which are connected serially.

For example, the infrared receiving demodulation madule (infrared receiver) P which are readily available from the market can be used as the infrared receiving demodulation circuit 6.

An integrated circuit IC2 (e.g., type HM8530), a crystal oscillator Y2, a resistor R10 and a mode conversion switch S2 are included in the mode detection circuit 8. Wherein the moving contact of the mode conversion switch S2 is connected to pin 3 of the integrated circuit IC2, and two fix contacts of which are connected to pin 9 and pin 18 of the integrated circuit IC2 respectively; pin 9 and pin 18 of the integrated circuit IC2 are also connected to the output pins of the infrared receiving demodulation integrated block P respectively, a resistor R10 is connected to pin 6 of the integrated circuit IC2. The integrated circuits IC1A, IC1B (e.g., type 358 operational amplifier), diodes D3 and D7, resistors R8 and R9 as well as a capacitor C2 are included in the buffering circuit 7. Wherein the in phase pin of the integrated circuit IC1A is connected to the output pin of the infrared receiving demodulation circuit 6 via a LC filter circuit constructed by the resistors R8, R9 and a capacitor C2, and the in phase pin of the integrated circuit IC1B is connected to the output pin of the integrated circuit IC1A via a diode D7 as well as pin 8 of the integrated circuit IC2 via a diode D3, and the opposite phase pin of the integrated circuits IC1A and IC1B are connected to their corresponding output pins respectively. The transistors Q4, Q5, diode D5, D6 and resistors R11 and R12 are included in the wire driver circuit 9. Wherein the base of the transistor Q4 is connected to the output pin of the buffering circuit 7 via the resistor R11, the emitter of which is connected to the ground (be connected to the positive end of the power supply) via a filtering capacitor C3 and a regulation diode D4, the base of the transistor Q5 is connected to the collector of the transistor Q4, the diode D6 and the resistor R12 are connected serially between the collector of the transistor Q4 and the collector of the transistor Q5, and the diode D5 is connected between the base and the emitter of the transistor Q5.

The integrated circuits IC3A, IC3B (e.g., type 4066 CMOS circuit), the transistors Q6,Q7, a capacitor C4 and the resistors R13 to R16 are included in the automatic switch circuit 10. Wherein the emitter of the transistor Q6 is connected to the collector of the above transistor Q5; the collector of the transistor Q7 is connected to the base of the transistor Q6; a resistor R14 is connected between the collectors of the transistors Q6 and Q7; one pin of the resistor 16 is connected to the base of the transistor Q7 while the another pin of which is connected to the gate of the integrated circuit IC3B; the capacitor C4 and the resistor R5 are connected in parallel, and one of their connecting terminals is connected to the emitter of the transistor Q7 while the other connecting terminal is connected to the gate of the integrated circuit IC3B; the ON-OFF pin of the integrated circuit IC3A is connected serially in the negative path of the mouse power circuit for enabling turning off the power circuit supplying to the infrared receiving demodulation circuit 6, the buffering circuit 7, the mode detection circuit 8 and the wire driver circuit 9; the ON-OFF pin of the integrated circuit IC3B is connected serially between the emitter of the transistor Q7 and the gate of the integrated circuit IC3A and connected to the positive end of the mouse power circuit via a resistor R13.

A battery E, a power circuit switch SW1, a capacitor C1, a resistor R7 and a indicating light (e.g., a LED is used) LED5 are included in the power circuit 12. Wherein one pin of the capacitor C1 is connected to the negative end of the battery E, while the other pin to the ground pin of the mouse transmitting part; the indicating light LED5 and the resistor R7 are connected serially between the negative end of the battery and the emitter of the transistor Q1.

The connectors (plugs and sockets) P1-1 to P1-5 with a conversion switch P1-SW as well as a diode D2 and a regulation diode ZD1 are included in the interface switch circuit 5. Wherein the sockets of the connectors P1-1 and P1-2 are connected to the ground pin (connecting the positive end of the power supply) of the mouse transmitting part; the socket of the connector P1-3 is connected to the ground pin via a regulation diode ZD1 and to the emitter of the transistor Q2 and the negative end of the battery E via a diode D2; the socket of the connector P1-4 is connected to the emitter of the transistor Q3; the socket of the connector P1-5 is connected to the collector of the transistor Q3; one moving contact of the conversion switch P1-SW is connected to the positive end of the battery E via a power circuit switch SW1, and the other moving contact of which is connected to the emitter of the transistor Q1, and the fix contact of which is connected to the ground pin of the mouse transmitting part.

The plugs of the connectors P1-1 to P1-5 and the cable which is used to connect those plugs (except P1-2) to the RS-232 interface of the mouse are included in the mouse receiver/transmitter interface circuit 11. Wherein the plug of the connector P1-1 is also connected to the ground pin of the mouse receiving part via the cable; the plug of the connector P1-2 is connected to the gate of the integrated circuit IC3B via the cable; the plug of the connector P1-3 is also connected to the emitter of the transistor Q7 via the cable; the plug of the connector P1-4 is also connected to the emitter of the transistor Q5 via the cable; the plug of the connector P1-5 is also connected to the collector of the transistor Q6 via the cable.

Referring to FIG. 2 and FIG. 3, the description of the action procedure of the mouse according to the first embodiment of the present invention will be further explained as follows.

When the cable mode is used to operate the mouse, all of the plugs of the connector P1 are inserted into their respective sockets. At this time, because the plugs and the sockets of the connectors P1-1 and P1-2 are connected together, so the voltage applied on the gate (trigger) of the integrated circuit IC3B from the mainframe of the computer via the cable is high level, and it makes the ON-OFF pin of the integrated circuit IC3B to conduct; the gate of the integrated circuit IC3A is pull-down to low level (that is, the gate of the integrated circuit IC3A is connected to the negative end of the mouse power circuit via the ON-OFF pin of the conducting integrated circuit IC3B), the ON-OFF pin of the integrated circuit IC3A is cut-off, thus the power circuit supplying the infrared receiving demodulation circuit 6 and the buffering circuit 7 is switched off. At the same time, because the voltage applied on the base of the transistor Q7 is at high level (corresponding to the input pin of the integrated circuit IC3A), the transistor Q7 will conduct and pull down the voltage of the base of the transistor Q6 to low level and the transistor Q6 is cut off so as the power circuit for supplying the wire driver circuit is switched off. The design purpose of this part of the circuit together with the diode D6 is to ensure that when the mouse is operated by using the cable operation mode, the transmitting part and receiving part of the mouse will not be interfered with each other, and the energy supply of the mouse transmitting part can be maintained. At this time, two moving contacts of the conversion switch P1-SW and two fix contacts which connect the ground pin (connecting the positive end of the power supply) of the mouse transmitting part will be separated by the joint action generated by the connection of the plugs and sockets of the connector P1 so that the power supplying line of the power circuit 12 is switched off, and the infrared modulating transmitter circuit 3 of the mouse transmitting part will be set at an inoperative state because of obtaining no power supply. Under this condition, the optical coding control circuit 1, microprocessor circuit 2 and wire driver circuit 4 of the mouse will be set at an operative state so that the mouse of the present invention will correspond to a conventional line control mouse.

When the remote control mode is used to operate the mouse, all of the plugs of the connector P1 will be removed from the corresponding sockets, thus the transmitting part and the receiving part of the mouse will be separated. At this time, the voltage supplying on the gate of the integrated circuit IC3B will be at low level and it will not conduct at the ON-OFF pin of the integrated circuit IC3B, so that the voltage on the gate of the integrated circuit IC3A will be pulled up to high level. Thereby the ON-OFF pin of the integrated circuit IC3A will conduct and thus the power circuit path between the computer and the infrared receiving demodulation circuit 6 and the buffering circuit 7 of the mouse transmitting part will be connected. At this time, because of the low level voltage applied on the base of the transistor Q7 the transistor Q7 will cut off, and the voltage on the base of the transistor Q6 will be pulled up to high level and Q6 will be operated at a conducting state, thereby the power circuitpath of the wire driver 9 will be connected and all of the circuits of the mouse receiving part will be at an operative state.

Moreover, at the transmitting part of the mouse, because of the joint action generated by the separation of the plugs and sockets of the connector P1, two moving contacts of the conversion switch P1-SW and two fix contacts which connect the ground pin (connecting the positive end of the power supply) of the mouse transmitting part will be connected and thus the power circuit line of the power circuit 12 will be switched on so that the optical encode control 1, the microprocessor circuit 2 and the infrared modulating transmitter circuit 3 will be supplied by the battery E. At this time, the separation of the plugs and sockets of the connector P1 will make the wire driver circuit 4 of the mouse transmitting part obtaining no power circuit and thus the operation of which will be disabled.

At the transmitting part of the mouse, the operation signal of the mouse will be input to the microprocessor circuit 2 for processing after encoding by the optical coding control circuit 1. The encoded pulse signal output from the microprocessor circuit 2 will be inverted by a negation gate constructed by the integrated circuit U2B in the infrared modulating transmitter circuit 3 (the integrated circuit U2B can be omitted, if the encoded pulse signal can be matched without a negation gate, then the input pin of the integrated circuit U2A will be connected directly to the seventh pin of the integrated circuit U1 of the microprocessor circuit 2). The encoded pulse signal after inverting will be input to two input pins of the integrated circuit U2A of the infrared modulating transmitter circuit 3 together with a carrier signal output from the second pin of the integrated circuit U1 of the microprocessor circuit 2, after modulating by the integrated circuit U2A it will be input to the base of the transistor Q1 via the resistor R2. After the modulated signal being amplified by the transistor Q1, by which the infrared LEDs LED3 and LED4 will be driven and the infrared pulse signal will be transmitted.

After the infrared pulse signal from the transmitting part being received by the infrared receiving demodulation circuit 6 of the receiving part, the signal is amplified and demodulated, and the original encoded pulse signal will be reproduced. The clutter component in the input encoded pulse signal will be filtered by an anti interference circuit constructed by resistors R8, R9 and capacitor C2 in the buffering circuit 7, and it will be sent to a buffer amplifier constructed by the operational amplifiers IC1A and IC1B for amplifying, and then it will be input to the wire driver circuit 9 of the receiving part for carrying out the signal conversion. The converted signal will be sent to the mainframe of the computer, thereby the remote control operation of the mouse can be implemented for the computer.

The mode detection circuit 8 and mode conversion switch S1 and S2 will operate such that the mouse will be at the state of the compatible two-key mode, when the mode conversion switch S1 and S2 are set at the position of the upper contacts for a mouse in the remote control mode. The mode detection signal which is generated by loading the mouse drive program when starting the computer will be sent to the integrated circuit IC2 via a conducting transistor Q6 and a resistor R10. The resultant signal of the mode detection output from the integrated circuit IC2 will be sent back to the computer via a diode D3, an operational amplifier IC1B and a wire driver circuit 9, and the compatible two-key mode will be confirmed by the computer. When the mode conversion switch S1 and S2 are set at the position of the lower contacts, the mouse will be in the compatible three-key mode. If the mode detection signal which is generated by loading the mouse drive program by the computer is not be sent back after sending it to the mode detection circuit 8, a default of compatible three-key mode will be made by the computer. For a mouse in the line control operation mode, when the mode conversion switch S2 is set at the position of the upper contacts, the state of the mouse will be at the compatible two-key mode; when the mode conversion switch S2 is set at the position of the lower contacts, the state of the mouse will be at the compatible three-key mode. At this time, the mode detection circuit 8 and the mode conversion switch S1 will stop to work.

Figure 4:
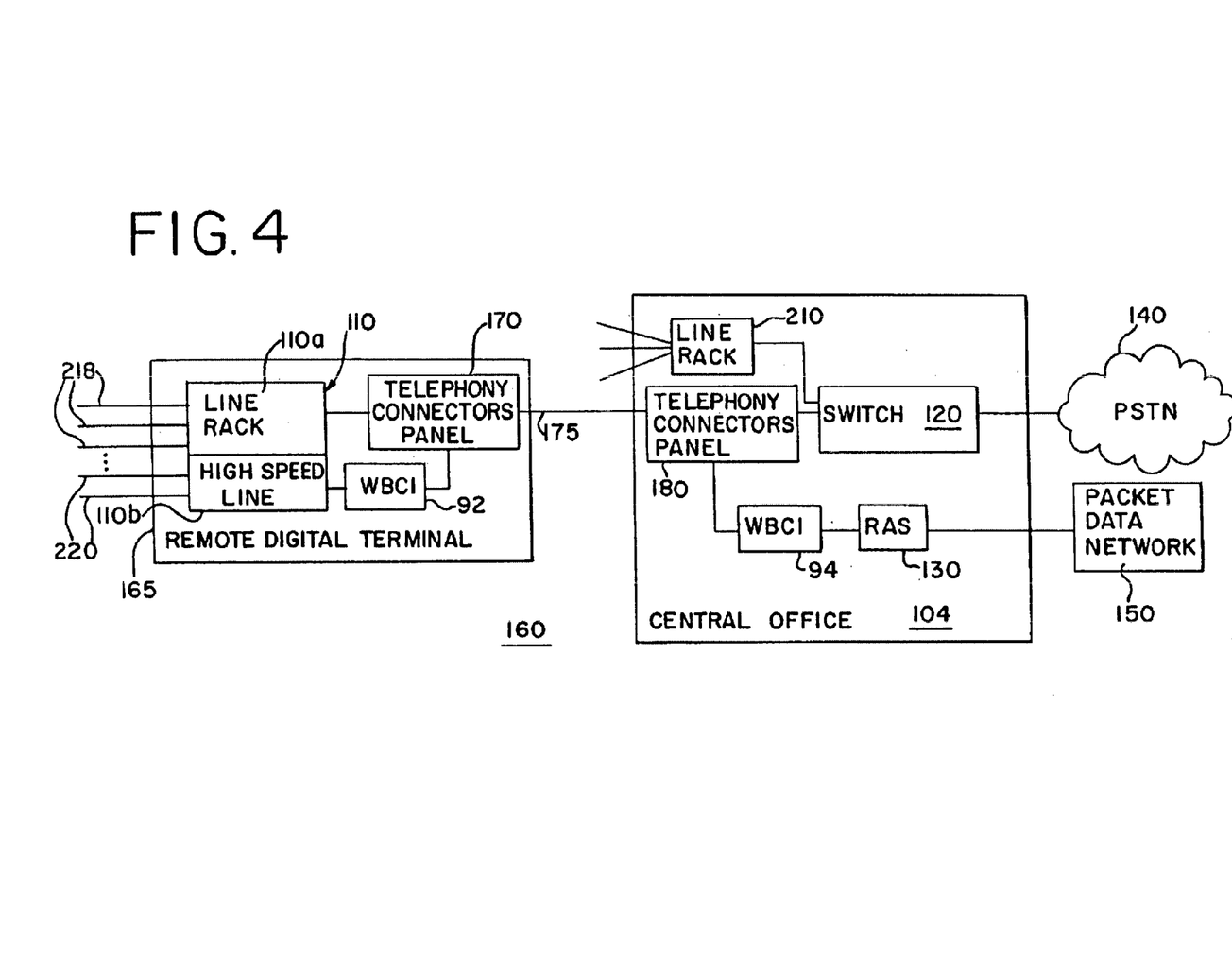
FIG. 4A and FIG. 4B are the block diagrams showing a mouse according to the second embodiment of the present invention.
Figure 4A:
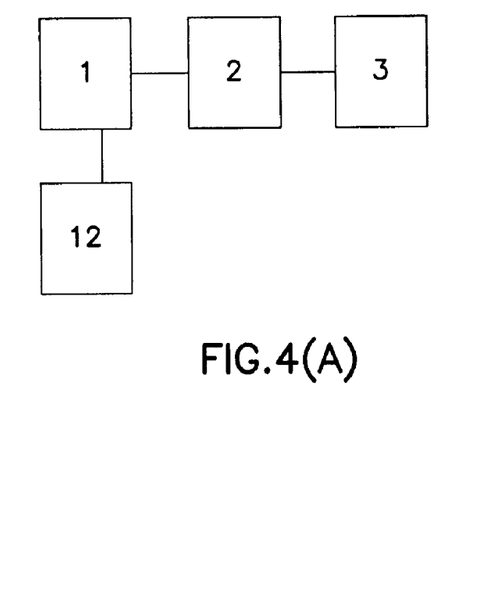
Figure 4B:
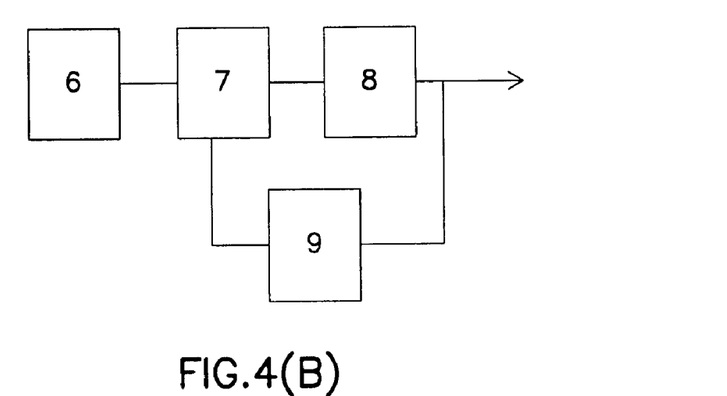
Figure 5:
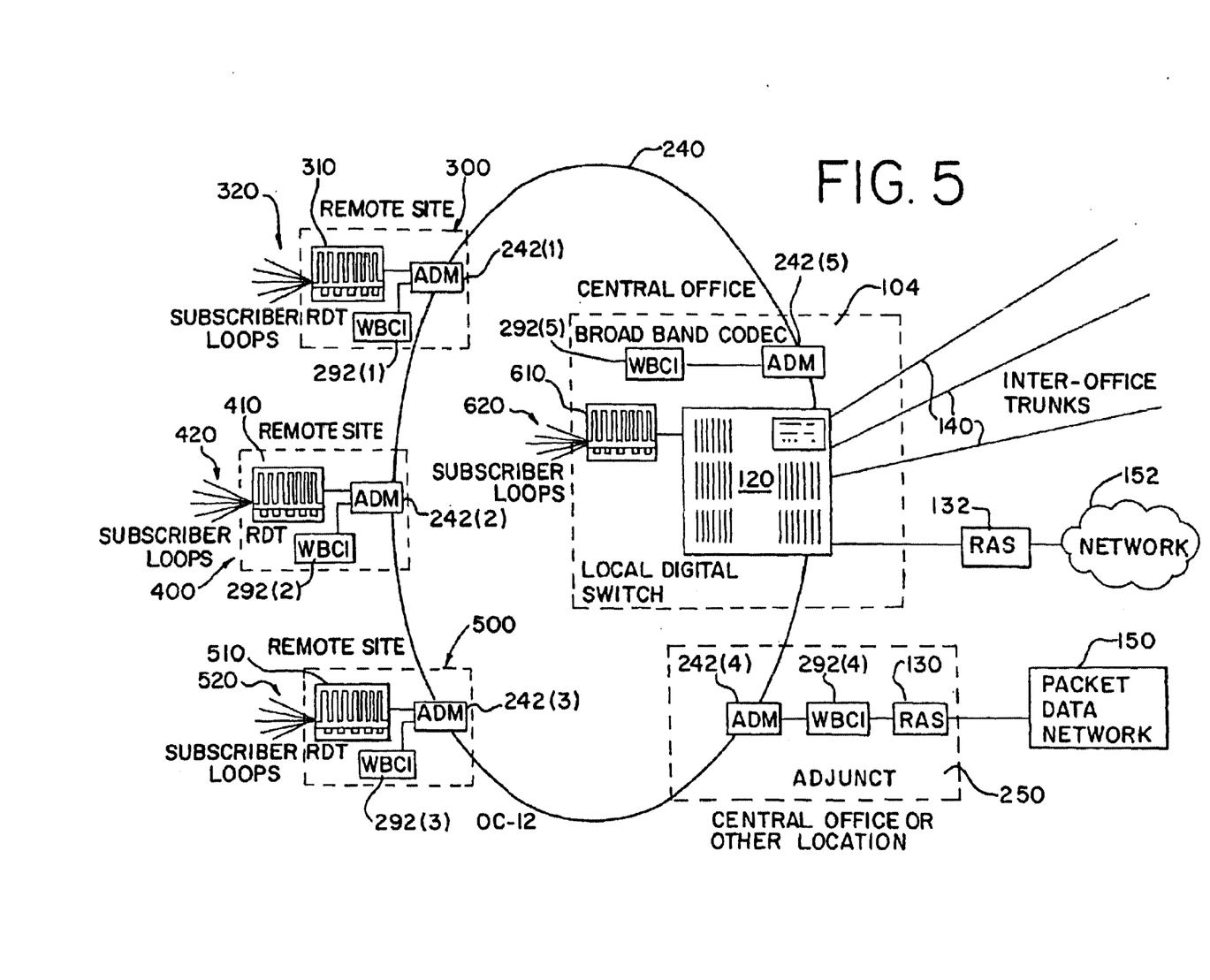
FIG. 5A and FIG. 5B are the detailed circuit diagrams indicating the mouse shown in FIG. 4A and FIG. 4B.
Figure 5A:
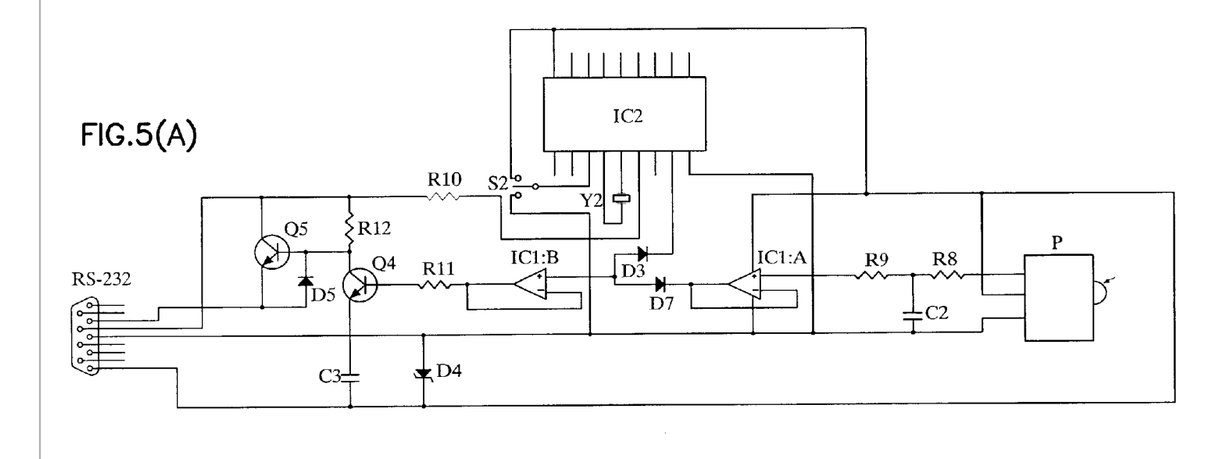
Figure 5B:
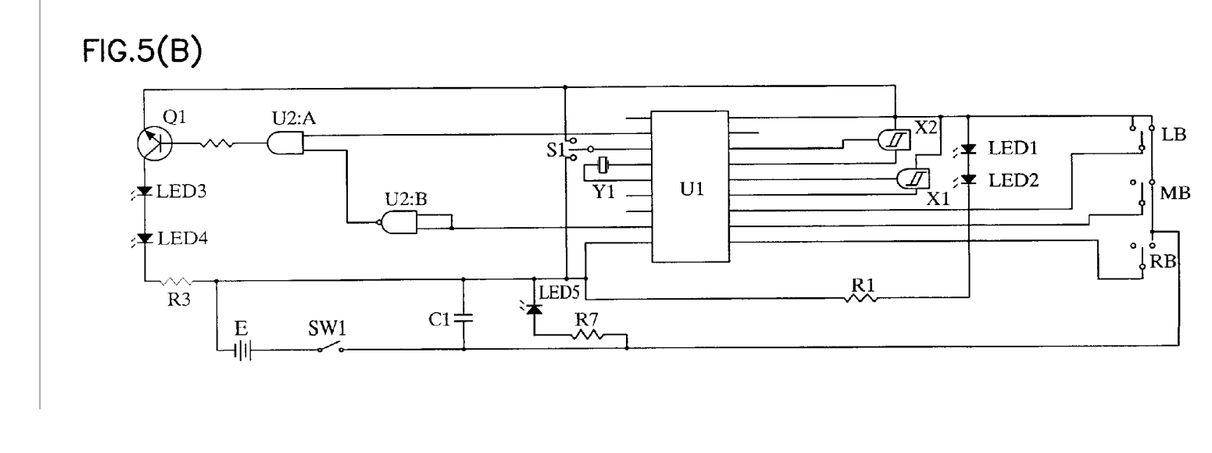

FIGS. 4A and 4B are the block diagrams indicating a mouse in accordance with the second embodiment of the present invention. FIG. 5A and FIG. 5B are the detailed circuit diagrams of the mouse shown in FIGS. 4A and 4B. The difference between the mouse of the second embodiment and that of the first embodiment is that the wire driver circuit 4, interface switch circuit 10, receiver/transmitter interface circuit 11 and diode D6 are omitted in the former thereby the mouse will be constructed as a mouse with a single infrared remote control function. The operation principle will be the same as that of the mouse setting at the remote control operation mode in accordance with the first embodiment and will not be repeated herein.

According to the mouse of the above two embodiments of the present invention, wherein, for example, the infrared receiving demodulation circuit, the buffering circuit, the wire driver circuit of the receiving part, the mode detection circuit and the automatic switch circuit can be configured inside the mainframe of the computer.

The mouse with the infrared remote control function has been explained in detail in the above description. Of course, the present invention is not intended to be limited to the above description. The various changes and modifications to the embodiments will be made by those skilled in the art based on the principle of the present invention. For example, the mode conversion switch S1 and S2 shown in FIG. 3 may be removed so that the circuit can be connected as the original mode at a state that the mode conversion switch S1 and S2 are set at the position of the upper contacts, and the mouse will be configured as a mouse of single compatible two-key mode. Also, the mode conversion switch S2 of the microprocessor circuit 2 shown in FIG. 3 may be omitted so that the circuit can be connected as the original mode at a state that the mode conversion switch S2 is set at the position of the lower contacts; and the diode D7, D3 of the buffering circuit 7 and the mode detection circuit 8 can be omitted and two pins of the original diode D7 will be shortened, thereby the mouse will be configured as a mouse of single compatible three-key mode.

APPLICABILITY OF THE INDUSTRY

The mouse with infrared remote control function of the present invention can be used as an input device of the computer or the likes of the electronic equipment. It is convenient for the users to operate remotely and the failure caused by the cable damage will be reduced.

What is claimed is:

1. A mouse with infrared remote control function comprising:

an optical coding control circuit for outputting an optical encoded signal after optically encoding the input operation instructions, a microprocessor circuit for outputting an encoded pulse signal after processing the optical encoded signal, and a wire driver circuit of a transmitting part for sending the signal to the mainframe of the computer after converting the encoded pulse signal, characterized in that the said mouse further comprises:

an infrared modulating transmitter circuit for modulating the said encoded pulse signal with infrared modulation and transmitting the infrared modulated signal outwards;

an infrared receiving demodulation circuit for receiving the said infrared modulated signal and demodulating the said signal into an encoded pulse signal;

a wire driver circuit of a receiving part for converting the demodulated encoded pulse signal and then transmitting it to the mainframe of the computer;

an interface switch circuit for switching the said wire driver circuit of the transmitting part to an operative state or an inoperative state;

an automatic switch circuit for switching the said infrared receiving demodulation circuit, the buffering circuit, and the wire driver circuit of the receiving part to an operative state or an inoperative state;

a receiver/transmitter interface circuit for connecting the said interface switch circuit and the automatic switch circuit; and a power circuit for supplying power to the said optical encode control circuit, microprocessor circuit and infrared modulating transmitter circuit.

2. A mouse as defined in claim 1, wherein it further comprises a buffering circuit for filtering and amplifying the encoded pulse signal which is demodulated by the said infrared receiving demodulation circuit.

3. A mouse as defined in claim 1, wherein it further comprises a mode detection circuit for receiving the mode detection signal which is generated by the computer when the mouse drive program is loaded and for returning the mode detection result of the mouse back to the computer.

4. A mouse as defined in claim 3, wherein the said microprocessor circuit comprises the first mode conversion switch for setting the said mouse at a compatible two-key mode or a compatible three-key mode.

5. A mouse as defined in claim 3, wherein the said mode detection circuit comprises the second mode conversion switch for setting the said mouse at a compatible two-key mode or a compatible three-key mode.

6. A mouse as defined in claim 3, wherein the said infrared receiving demodulation circuit, buffering circuit, wire driver circuit of the receiving part, mode detection circuit and automatic switch circuit are configured inside the said mainframe of the said computer.

7. A mouse with infrared remote control function comprising:
- an optical coding control circuit for outputting an optical encoded signal after optically encoding the input operation instructions, and
- a microprocessor circuit for outputting an encoded pulse signal after processing the optical encoded signal, characterized in that the said mouse further comprises:
- an infrared modulating transmitter circuit for modulating the said encoded pulse signal with infrared modulation and transmitting the infrared modulated signal outwards;
- an infrared receiving demodulation circuit for receiving the said infrared modulation signal and demodulating the said signal into an encoded pulse signal;
- a wire driver circuit of a receiving part for converting the demodulated encoded pulse signal and then transmitting it to the mainframe of the computer; and
- a power circuit for supplying power to the said optical encode control circuit, microprocessor circuit and infrared modulating transmitter circuit.

8. A mouse as defined in claim 7, wherein it further comprises a buffering circuit for filtering and amplifying the encoded pulse signal which is demodulated by the said infrared receiving demodulation circuit.

9. A mouse as defined in claim 7, wherein it further comprises a mode detection circuit for receiving the mode detection signal which is generated by the computer when the mouse drive program is loaded and for returning the mode detection result of the mouse back to the computer.

10. A mouse as defined in claim 9, wherein the said microprocessor circuit comprises the first mode conversion switch for setting the said mouse at a compatible two-key mode or a compatible three-key mode.

11. A mouse as defined in claim 9, wherein the said mode detection circuit comprises the second mode conversion switch for setting the said mouse at a compatible two-key mode or a compatible three-key mode.

12. A mouse as defined in claim 7, wherein it further comprises:
- a wire driver circuit of a transmitting part for converting the encoded pulse signal output from the said optical control circuit and then sending the converted signal to the mainframe of the computer;
- an interface switch circuit for switching the said wire driver circuit of the transmitting part to an operative state or an inoperative state;
- an automatic switch circuit for switching the said infrared receiving demodulation circuit, the buffering circuit and the wire driver circuit of the receiving part to the operative state or the inoperative state; and
- a receiver/transmitter interface circuit, for connecting the said interface switch circuit and the automatic switch circuit.

13. A mouse as defined in claim 9, wherein the said infrared receiving demodulation circuit, buffering circuit, wire driver circuit of the receiving part, and mode detection circuit are configured inside the said mainframe of the computer.

14. A mouse as defined in claim 12, wherein the said automatic switch circuit is configured inside the said mainframe of the said computer.

* * * * *

UNITED STATES PATENT AND TRADEMARK OFFICE
CERTIFICATE OF CORRECTION

PATENT NO. : 6,657,559 B1
DATED : December 2, 2003
INVENTOR(S) : Li

It is certified that error appears in the above-identified patent and that said Letters Patent is hereby corrected as shown below:

Drawings,
Delete drawing sheets 1-5, and substitute therefor the attached drawing sheets 1-5.

Signed and Sealed this

Sixth Day of April, 2004

JON W. DUDAS
*Acting Director of the United States Patent and Trademark Office*

(12) United States Patent
Li (10) Patent No.: US 6,657,559 B1
(45) Date of Patent: Dec. 2, 2003

(54) MOUSE WITH REMOTE CONTROL FUNCTION OF INFRARED RAY

(76) Inventor: Jing Li, P.O.B. 5001-410, Nam Fei, Xin Xi, Qiao, Nan Chang, Jiang Xi, 330024 (CN)

(*) Notice: Subject to any disclaimer, the term of this patent is extended or adjusted under 35 U.S.C. 154(b) by 0 days.

(21) Appl. No.: 09/581,403
(22) PCT Filed: Dec. 15, 1998
(86) PCT No.: PCT/CN98/00308
§ 371 (c)(1),
(2), (4) Date: Jul. 25, 2000
(87) PCT Pub. No.: WO99/31570
PCT Pub. Date: Jun. 24, 1999

(30) Foreign Application Priority Data

| Dec. 16, 1997 | (CN) | 97230442 U |
|---|---|---|
| Dec. 16, 1997 | (CN) | 97230444 U |
| Feb. 4, 1998 | (CN) | 98210404 U |
| Feb. 4, 1998 | (CN) | 98210405 U |

(51) Int. Cl.⁷ ............................................. H03K 17/94
(52) U.S. Cl. ..................... 341/20; 341/173; 341/176; 345/156; 345/163; 345/167; 455/74.9
(58) Field of Search ...................... 341/20, 176, 173; 345/164, 163, 167, 2.1, 169, 157, 156; 455/74.1

(56) References Cited

U.S. PATENT DOCUMENTS

| 5,726,684 A | * 3/1998 | Blankenship et al. ....... 345/163 |
|---|---|---|
| 5,854,621 A | * 12/1998 | Junod et al. ................. 345/158 |
| 5,943,625 A | * 8/1999 | Yeom et al. ................. 345/157 |
| 6,219,037 B1 | * 4/2001 | Lee ............................. 345/156 |
| 6,225,981 B1 | * 5/2001 | Lu ............................... 345/163 |

FOREIGN PATENT DOCUMENTS

| CN | 93100683.X | 8/1994 |
|---|---|---|
| CN | 96237391.5 | 11/1997 |

OTHER PUBLICATIONS

International Search Report for application PCT/CN98/00308, dated Jan. 15, 1999.

* cited by examiner

Primary Examiner—Michael Horabik
Assistant Examiner—Albert K. Wong
(74) Attorney, Agent, or Firm—Merchant & Gould, P.C.

(57) ABSTRACT

A mouse with infrared remote control function comprises: an optical encode control circuit, a microprocessor circuit, a wire driver circuit of the transmitting part, an infrared modulating transmitter circuit, an infrared receiving demodulation circuit, a wire driver circuit of the receiving part, an interface switching circuit, a receiver/transmitter interface circuit and a power circuit (it can be switched off) for supplying the power circuit to the said optical encode control circuit, microprocessor circuit, infrared modulating transmitter circuit. Besides a single-purpose mouse with infrared remote control function is provided by the present invention, by using the interface switch circuit and automatic switch circuit, a dual-purpose mouse with both compatible infrared remote control function and compatible cable control function can be implemented.

14 Claims, 5 Drawing Sheets